(12) United States Patent
Ding (10) Patent No.: US 8,254,925 B2
(45) Date of Patent: Aug. 28, 2012

(54) METHOD FOR SIMPLIFYING THE PROCESS OF TRANSMITTING MESSAGE

(75) Inventor: Yingzhe Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 883 days.

(21) Appl. No.: 11/650,189

(22) Filed: Jan. 4, 2007

(65) Prior Publication Data

US 2007/0178878 A1 Aug. 2, 2007

Related U.S. Application Data

(63) Continuation of application No. PCT/CN2005/001979, filed on Nov. 23, 2005.

(30) Foreign Application Priority Data

Mar. 28, 2005 (CN) .......................... 2005 1 0056893

(51) Int. Cl.
*H04W 4/00* (2009.01)
(52) U.S. Cl. ..................................... 455/435.1; 370/310
(58) Field of Classification Search ........................ None
See application file for complete search history.

(56) References Cited

U.S. PATENT DOCUMENTS

| | | | |
|---|---|---|---|
| 6,473,399 B1 * | 10/2002 | Johansson et al. ............ | 370/229 |
| 2001/0018342 A1 | 8/2001 | Vialen et al. | |
| 2002/0009067 A1 * | 1/2002 | Sachs et al. ................... | 370/338 |
| 2004/0038681 A1 | 2/2004 | Chun | |
| 2004/0229626 A1 * | 11/2004 | Yi et al. ......................... | 455/450 |
| 2005/0026597 A1 * | 2/2005 | Kim et al. .................. | 455/412.1 |
| 2005/0054298 A1 | 3/2005 | Chen | |
| 2005/0174977 A1 * | 8/2005 | Pedlar et al. .................. | 370/342 |
| 2006/0034204 A1 * | 2/2006 | Lee et al. ....................... | 370/312 |
| 2006/0153237 A1 * | 7/2006 | Hwang et al. ................. | 370/469 |

FOREIGN PATENT DOCUMENTS

| | | |
|---|---|---|
| CN | 1487754 | 4/2004 |
| CN | 1516373 | 7/2004 |
| CN | 1568079 | 1/2005 |
| WO | WO 2006/016784 | 2/2006 |

OTHER PUBLICATIONS

International Search Report for International Application No. PCT/CN2005/001979, mailed Jan. 26, 2006.
ETSI Standards, "Universal Mobile Telecommunications System (UMTS); Radio Resource Control (RRC) Protocol Specification," 3GPP TS25.331 v6.4.0 (2004).

(Continued)

*Primary Examiner* — Charles Appiah
*Assistant Examiner* — Jaime Holliday
(74) *Attorney, Agent, or Firm* — Huawei Technologies Co., Ltd.

(57) ABSTRACT

The present invention discloses a method for messages transmission in a simplified way, UE transmitting the messages to the network through the lower layer, the method includes following steps: if the lower layer indicates the message has been transmitted successfully, then starting timer, otherwise, ending the current procedure; if the UE has received response from the network before the timer expires, stopping the timer; otherwise, ending the current procedure. The method can effectively avoid unnecessary operations, and reduce energy consumption of the UE.

18 Claims, 5 Drawing Sheets

OTHER PUBLICATIONS

Supplementary European Search Report for Application No. EP05814785, dated Jan. 15, 2008.

3GPP TS 25.322 V6.2.0: "3rd Generation Partnership Project; Technical Specification Group Radio Access Network; Radio Link Control (RLC) protocol specification (Release 6)", dated Dec. 2004, total 82 pages.

3GPP TS 25.331 V6.4.0: "3rd Generation Partnership Project; Technical Specification Group Radio Access Network; Radio Resource Control (RRC) protocol specification (Release 6)", dated Dec. 2004, total 1651 pages.

First Office Action of corresponding Chinese Patent Application No. 200710181489.7, mailed on Aug. 21, 2009, and English translation thereof, 5 pages total.

First Office Action of corresponding Chinese Patent Application No. 200510056893.2, mailed on Mar. 16, 2007, and English translation thereof, 4 pages total.

First Office Action of corresponding European Patent Application No. EP05814785.1, mailed on Sep. 16, 2008, 5 pages total.

Second Office Action of corresponding European Patent Application No. EP05814785.1, mailed on Mar. 3, 2009, 4 pages total.

* cited by examiner

Fig. 7

METHOD FOR SIMPLIFYING THE PROCESS OF TRANSMITTING MESSAGE

CROSS-REFERENCES TO RELATED APPLICATIONS

This is a continuation of International Application No. PCT/CN2005/001979, which was filed on Nov. 23, 2005, and which, in turn, claimed the benefit of Chinese Patent Application No. 200510056893.2, which was filed on Mar. 28, 2005, the entire disclosures of which are hereby incorporated herein by reference.

BACKGROUND OF THE DISCLOSURE

1. Field of the Technology

The present invention relates to messages transmitting techniques, and more particularly to a method for transmitting the lower layer message of User Equipment (UE) in Multimedia Broadcast/Multicast Service (MBMS) system in a simplified way.

2. Background of the Invention

Multicast and broadcast are the techniques for transmitting data from one data source to multiple targets. In traditional mobile communication networks, Cell Multicast Service or Cell Broadcast Service (CBS) allow low speed data to be transmitted to all subscribers through cell shared broadcast channels, which belongs to message services.

Nowadays, simple telephone and message services can no longer meet requirements of subscribers on mobile communication; sharp development of the Internet has brought many new diversified mobile multimedia services. Wherein, some mobile multimedia services such as video on demand, television broadcasting, video conference, online education and interactive games etc., require that several subscribers can receive the identical data simultaneously. Compared with common data services, these mobile multimedia services have the properties of large quantity of data, long duration and are delay-sensitive. The current Internet protocol (IP) multicast and broadcast techniques can only be applied to the wired IP communication networks rather than mobile communication networks, because the mobile communication network has special network architecture, function entities and radio interfaces, which are different from those of wired communication IP network.

In order to make full use of Mobile Communication network resources, International Organization for the third Generation Standardization (3GPP) introduced the concept of multicast and broadcast (MBMS), and thereby provides Point To Multipoint (PTM) service where one data source transmits data to multiple targets in Mobile Communication networks, to share network resources and increase Utilization Ratio of network resources, and especially idle interface resources. The MBMS defined by 3GPP can not only implement multicast and broadcast of low speed messages such as plain text, but also multicast and broadcast of high speed multimedia services, which undoubtedly meets the requirements of future mobile data development.

Figure 1:
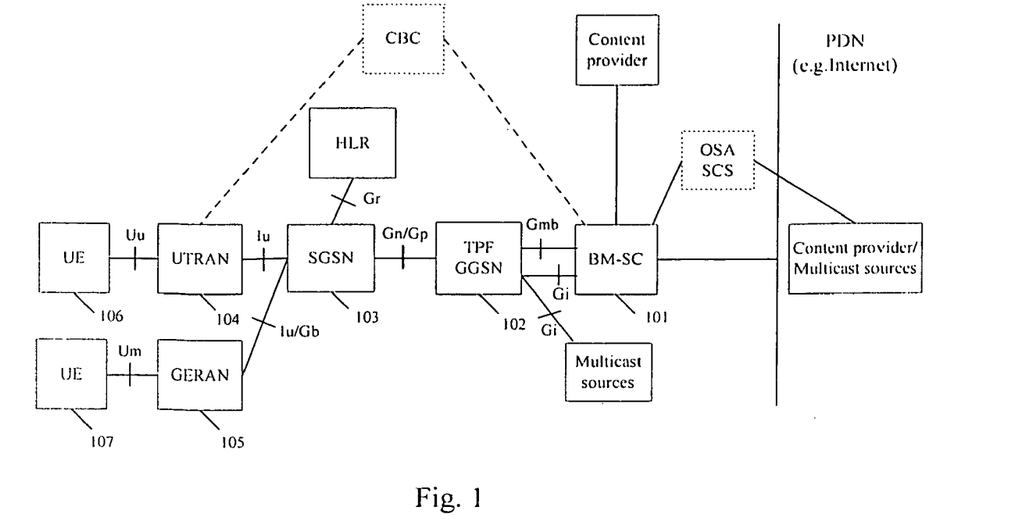
FIG. 1 is a schematic diagram illustrating architecture of a radio network that supports Broadcast/Multicast service.

FIG. 1 is a schematic diagram illustrating architecture of a radio network that supports Broadcast/Multicast service, as shown in FIG. 1, in prior 3GPP, entity of the radio network that supports Broadcast/Multicast service is Broadcast/Multicast service server (BM-SC) 101, and BM-SC 101 links TPF GGSN (Gateway GPRS Support Node) 102 through Gmb interface or Gi interface, one BM-SC 101 can connect with multiple TPF GGSN 102; TPF GGSN 102 further connects to SGSN (Serving GPRS Support Node) 103 via Gn/Gp interface, one GGSN 102 can connect with multiple SGSN 103; SGSN 103 can link UTRAN (Universal Terrestrial Radio Access Network) 104 of Universal Mobile Telecommunication System (UMTS) through Iu interface, and then UTRAN 104 connects with UE 106 via Uu interface, SGSN 103 can also connect with GERAN (GSM/EDGE Radio Access Network) 105 in GSM (Global System of Mobile communication) through Iu/Gb interface, and GERAN 105 further connects with UE 107 via Um interface. Wherein, both GGSN and SGSN are nodes of Core Network (CN) in radio network.

From the network structure shown in FIG. 1 it can be seen that, in order to support MBMS service, Broadcast/Multicast service center, i.e. BM-SC, the mobile network function entity was introduced into 3G Mobile Communication system, the BM-SC is the entrance to content providers, which can be used for the authorization and initiating MBMS bearer service in mobile networks and transmitting MBMS contents based on preset schedules. Besides, MBMS related functions have also been added to function entities such as UE, UTRAN, GERAN, SGSN and GGSN etc.

MBMS consists of multicast mode and broadcast mode, wherein, multicast mode requires users to subscribe in relevant Multicast group, activate the services and generate corresponding charge information. The difference between multicast mode and broadcast mode in service requirement results in dissimilar operation flow between the two modes, as shown in FIG. 2 and FIG. 3, FIG. 2 is a schematic flowchart illustrating operation in MBMS Multicast mode, while FIG. 3 is a schematic flowchart illustrating operation in MBMS Broadcast mode.

Figure 2:
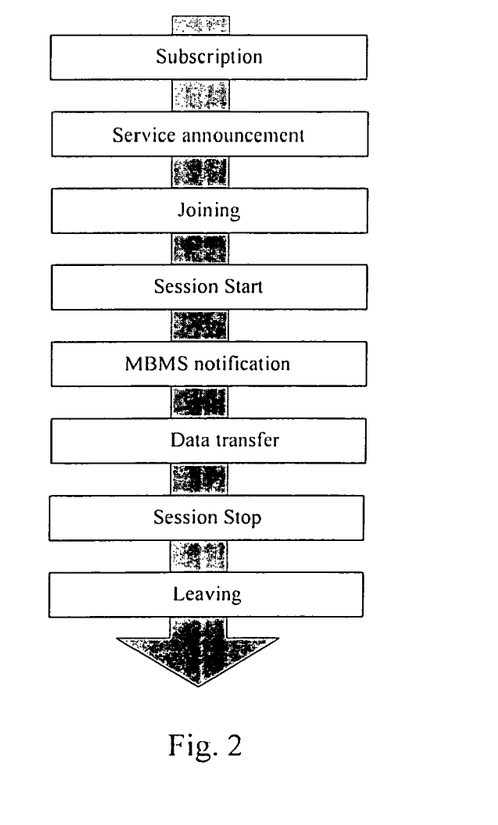
FIG. 2 is a schematic flowchart illustrating the service procedure in MBMS Multicast mode.

As shown in FIG. 2, processing steps involved in MBMS Multicast service includes: Subscription, Service announcement, Joining, Session Start, MBMS notification, Data transmit, Session Stop and Leaving. Wherein, the UE can subscribe wanted MBMS services in Subscription step; BM-SC may announce currently available services during Service announcement step; Joining step refers to the MBMS multicast service activating process, when the UE informs the network its willingness to be a member of current multicast group and accept multicast data of corresponding services, an MBMS UE context will be generated in the network and UE that joined the multicast group to record UE information during the joining step; in Session Start step, BM-SC will prepare data transmitting, and notify the network to establish bearer resource of relevant Core Network and access network; during MBMS notification step, the UE will be notified that MBMS multicast session will start soon; during Data transmit step, BM-SC transmits the data to the UE through bearer resource established in Session Start step, wherein, MBMS service has two modes while transmitting between UTRAN and UE: Point To Multipoint (PTM) mode and Point To Point (PTP) mode, wherein, PTM mode means that identical data will be transmitted through MTCH logical channels, and available to all UEs that subscribed Multicast service or were interested in Broadcast service, while PTP mode means data are transmitted via DTCH logical channel and available only to one corresponding UE; in Session Stop step, the bearer resource established in Session Start step will be freed; and subscribers in the group will leave the multicast group in Leaving step, which means that the UE will no longer accept Multicast data, and corresponding MBMS UE context will also be deleted in the step.

Figure 3:
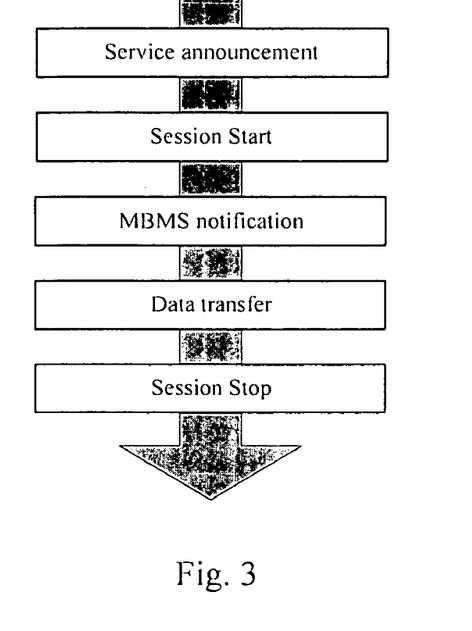
FIG. 3 is a schematic flowchart illustrating the service procedure in MBMS Broadcast mode.

Now referring to FIG. 3, processing steps involved in MBMS Broadcast service are similar to these of MBMS Multicast service, however, it is unnecessary to implement Subscription process and Joining process before Session Start, and also unnecessary to implement leaving step after Session Stop.

During Data transmit steps of Multicast mode operation and Broadcast mode operation, MBMS service has two modes for transmitting message between UTRAN and UE: Point To Multipoint (PTM) mode and Point To Point (PTP) mode. Wherein, PTM MODE means that identical data will be transmitted through MBMS PTM service channel (MTCH), and available to all UE that subscribed Multicast service or were interested in Broadcast service; while PTP mode means data is transmitted via dedicated service channel (DTCH) and available only to one corresponding UE.

Figure 4:
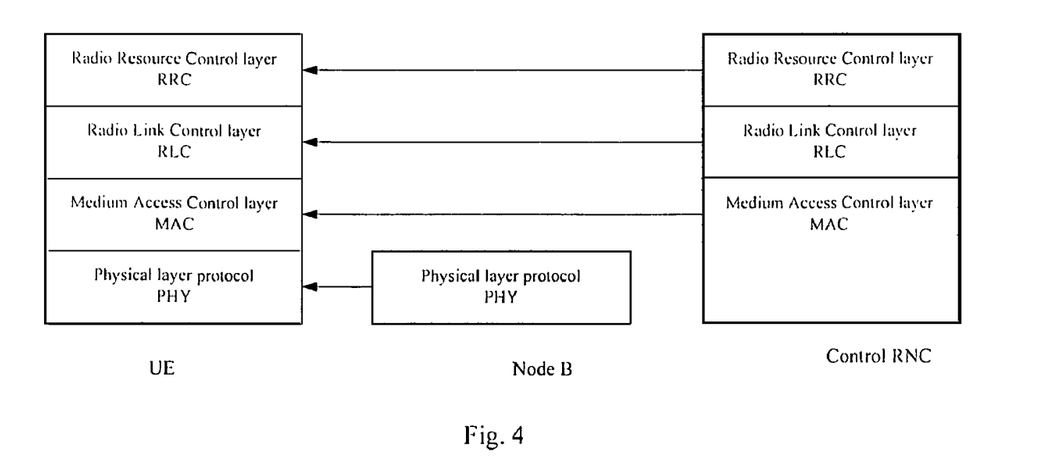
FIG. 4 is a schematic diagram illustrating Protocol Stack structure of MCCH.

In MBMS PTM transmit mode, relevant radio control message includes service information, access information, radio bearer information and Frequency Layer Convergence (FLC) information etc., which are transmitted by Radio Resource Control (RRC) through logical channel such as MBMS PTM Control Channel (MCCH). Protocol Stack structure of MCCH is shown in FIG. 4, Protocol units of the MCCH can be listed from top to bottom as follows: RRC layer, Radio Link Control (RLC) layer, Medium Access Control (MAC) layer and Physical (PHY) layer.

In MBMS system, in order to determine optimum transport mode for each assigned MBMS service, the system introduced MBMS counting process, i.e. UTRAN employing counting process to estimate number of UEs which are interested in certain MBMS service in a cell, and the counting process differs according to different status of the UE.

According to whether RRC connection has been established in current Mobile Communication system, status of the UE can be classified into Idle mode and RRC Connected mode. Wherein, the UE that has not established RRC connection with UTRAN equipment stays in Idle mode, where, the UE can only be distinguished through identifier of Non-Access Stadium (NAS) such as International mobile subscriber identity (IMSI); and the UE that has established RRC connection with UTRAN equipment stays in RRC Connected mode, where, a Radio Network Temporary Identity (RNTI) has been assigned for the UE to act as identity of the UE in common transport channels.

Moreover, the UEs in RRC Connected mode can be further classified into different status according to different layer of RRC connection and type of transport channels available to the UE, wherein, the UE in CELL_PCH status, CELL_FACH status and CELL_DCH status can be identified on the cell layer, while the UE in URA_PCH status can be identified on UTRAN Registration Area (URA) layer. A dedicated physical channel will be assigned for the UE in CELL_DCH status, therefore, the UE can use the dedicated transport channel or shared channel or their combination; the UE in CELL_FACH status needs downlink to continuously monitor a common transport channel (FACH, Forward Access Channel.), and uplink to assign random common channel (RACH, Random Access Channel); the UE in CELL_PCH and URA_PCH status adopts Discontinuous Reception (DRX) means to monitor a Paging Channel (PCH) through relevant PICH channel, however, there are no uplink movement under these two statuses.

Generally, MBMS counting process is initiated by Radio Network Controller (RNC), when service Session Start step needs establishing radio bearer and RNC considers it is necessary, RNC issues notification message and sends probability factor simultaneously through the access information, after receiving the notification messages, the UE under Idle mode may acquire access information, and initiate RRC connection setup process to respond to counting process if probability factor check is passed; while the UE under URA_PCH status and CELL_PCH status will acquire access information after receiving the notification messages, and initiate cell update process to respond to counting process if probability factor check is passed; and the UE under CELL_FACH status will respond to counting process through other means after receiving the notification messages. Wherein, implementing probability factor check simply is to avoid collision of different UEs during accessing step and make the accessing process of UE discrete as much as possible, the method further includes following steps: generating a random number within 0~1 and comparing the generated random number with designated probability factor, if the random number is less than the designated probability factor, then the probability factor check is passed, otherwise the probability factor checking process fails.

During counting process of the UE under Idle mode, the UE initiates the RRC connection establishment procedure through transmitting the RRC connection request message RRC CONNECTION REQUEST, when the RRC CONNECTION REQUEST message is used for the MBMS counting procedure, the RRC transmitting steps for the UE is as follows:

After contents of RRC CONNECTION REQUEST message having been configured, the UE transmitting the configured RRC CONNECTION REQUEST message on the uplink Common Control Channel (CCCH), and setting the value of the state variable V300 to 1; the RRC CONNECTION REQUEST message is transmitted via the RLC layer and MAC layer of Protocol Stack at the UE, after transmitting the message, MAC layer generating an indication to indicate whether the message had been transmitted successfully, and starting timer T318 simultaneously, and setting the value of counter N300 to 0. Wherein, V300, N300 and T318 are the variable names of the state variable, the counter and the timer regulated in standard protocol respectively.

Before timer T318 expires, if the UE has received the response message transmitted from UTRAN, then it indicates that RRC connection establishment procedure of the UE succeeds, then stopping timer T318; otherwise, waiting for the response message transmitted from the network until the timer expires. When timer T318 expires, if the value of state variable V300 is greater than that of counter N300, then the RRC connection establishment procedure of the UE fails and the UE turning into the Idle mode; besides, the UE implementing a series of operations regulated by the protocol after the UE turning from the RRC Connected mode into the Idle mode, and then finishing the entire processing procedures; otherwise, sending a new RRC CONNECTION REQUEST message on the uplink CCCH, and enabling the value of state variable V300 to increase by degrees.

From the above processing procedures, it can be seen that, the prior technical schemes have the following disadvantages: at present, no matter whether MAC layer transmitting the RRC CONNECTION REQUEST message succeeds or not, the UE initiates timer T318 in any case, however, if MAC layer informs that the RRC CONNECTION REQUEST message transmitting procedure fails, then it is unnecessary to start timer T318 any more, the counting process will be finished in this case.

SUMMARY OF THE INVENTION

In view of the above, the present invention provides a method for messages transmission in a simplified way. The technical solution of the present invention is achieved as follows:

A method for messages transmission in a simplified way, including, transmitting a message from an User Equipment (UE) to a network through a lower layer, starting a timer if the lower layer indicates the message has been transmitted successfully, or ending a current procedure if the lower layer indicates the message has been transmitted unsuccessfully;

stopping the timer if the UE has received a response from the network before the timer expires, or ending the current procedure if the UE has not received a response from the network before the timer expires.

According to above scheme, before the processing of the lower layer indicating that the message has been transmitted successfully, the method further includes: setting an initial value of a counter, and setting a threshold value of the counter;

before the processing of ending the current procedure if the lower layer indicating the message has been transmitted unsuccessfully, the method further includes: starting the timer if the current value of the counter is not greater than the threshold value of the counter, or ending the current procedure if the current value of the counter is greater than the threshold value of the counter;

before the processing of ending the current procedure if the UE has not received the response from the network before the timer expires, the method further includes: retransmitting the message to the network, correcting the current value of the counter, and returning to the processing of the lower layer indicating that the message has been transmitted successfully if the current value of the counter is not greater than the threshold value of the counter; or ending the current procedure if the current value of the counter is greater than the threshold value of the counter.

Wherein, the setting initial value of the counter is 1; and the preset threshold value of the counter is 0.

Wherein, the processing of setting the threshold value of the counter includes: the network setting the threshold value of the counter, and sending the threshold value to the UE through a standardized message.

In above scheme, if the preset threshold value of the counter is the maximum of the current counter, then the processing of correcting the current value of the counter includes increasing the current value of the counter by degrees;

or, if the preset threshold value of the counter is the minimum of the current counter, then the processing of correcting the current value of the counter includes descending the current value of the counter by degrees.

In above scheme, the method further includes: setting the initial value of the counter to 1 before determining whether the message has been transmitted successfully;

setting the threshold value of the counter to 0 before determining whether the message has been transmitted successfully or while starting the timer; and checking and confirming that the current value of the counter is greater than the threshold value of the counter before ending the current procedure if the UE has not received the response from the network before the timer expires.

Wherein, the method further includes: the UE turning into an idle mode, and implementing all operations from a connection mode to the idle mode before ending the current procedure.

Wherein, the message includes a Radio Resource Control (RRC) message or a counting response message; the lower layer includes a Medium Access Control (MAC) layer.

Wherein, the RRC message includes a RRC connection request message or a cell update message.

In above scheme, the method further includes: the UE turning into the idle mode and implementing all operations from the connection mode to the idle mode before ending the current procedure.

In the method for messages transmission in a simplified way according to the present invention, as the UE can implement different operations on subsequent procedures based on indications showing success or failure in message transmit in MAC layer, the timer is not necessary to be started after failing in message transmit, and therefore the present invention can avoid unnecessary timer operation, reduce consumption of UE resources and power, and further reduce operation cost of the UE. For the case when it is necessary to transmit the message only once, the present invention can retrench the counter and state variable setting and checking steps, therefore, simplifying relevant operation steps and reducing complexity of the procedures.

DETAILED DESCRIPTION OF THE PREFERRED EMBODIMENTS

In the present invention, whether to start the timer or not can be determined based on the indication showing success or failure in message transmitting at the lower layer. Wherein, the message refers to the message which can tell current UE of RNC to receive the given MBMS services, such as a RRC message or other counting response messages, wherein, the RRC message can be a RRC CONNECTION REQUEST message or a cell update message etc.; the lower layer is a MAC layer. Following steps just take the case that transmitting the RRC CONNECTION REQUEST message, and the MAC layer generating indications showing success or failure in the message transmit as example.

In practical application, the RRC CONNECTION REQUEST message can be transmitted once or several times, correspondingly, under the conditions of different message transmitting times, the processing procedures of the counter and the state variable may consequently differ. The RRC CONNECTION REQUEST message transmitting procedure in accordance with the present invention will be described in more detail hereinafter with reference to the drawings and embodiments.

Embodiment One

In this embodiment, the RRC CONNECTION REQUEST message is transmitted only once, and the processing procedures of the counter and the state variable during the RRC CONNECTION REQUEST message transmitting procedure are implemented according to regulations of the existing standard protocol.

Figure 5:
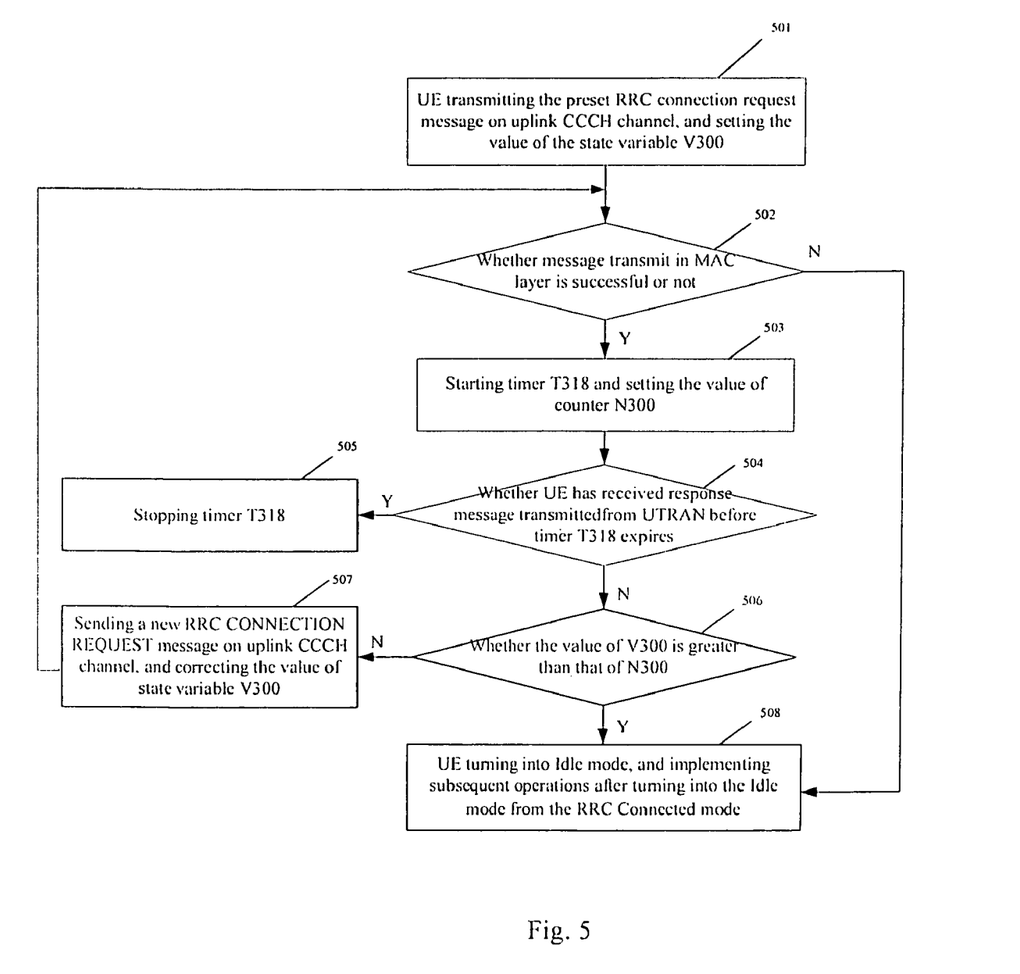
FIG. 5 is a schematic flowchart illustrating implementing procedures of one embodiment in accordance with the present invention.

As shown in FIG. 5, the processing procedure of transmitting the RRC CONNECTION REQUEST message in this embodiment includes the following steps:

Step 501: after setting contents of the RRC CONNECTION REQUEST message, the UE sending the preset RRC CONNECTION REQUEST message on uplink CCCH channel, and setting the value of the state variable V300 to 1.

Step 502 to 503: if the MAC layer indicating the message has been transmitted successfully, then starting the timer T318, and setting the value of the counter N300 to 0; otherwise, going to Step 508.

In practice, the value of the counter N300 can be set while starting the timer; it can also be set before Step 502.

Step 504 to 505: if the UE has received the response message transmitted from UTRAN before the timer T318 expires, then stopping the timer T318, showing the RRC connection establishment procedure of the UE is successful, and then ending the current procedure; otherwise, going to Step 506.

Step 506 to 507: checking whether the value of the state variable V300 is greater than that of the counter N300, if yes, then going to Step 508; otherwise, transmitting a new RRC CONNECTION REQUEST message on the uplink CCCH channel, correcting the value of the state variable V300, and returning to Step 502.

Wherein, the value of the counter N300 corresponds to the threshold value of the state variable V300. For the reason that this embodiment examines the case of transmitting the RRC CONNECTION REQUEST message only once, therefore value setting of the counter N300 and the state variable V300 exclusively refer to enabling the value of the state variable V300 is greater than that of the counter N300, so as to avoid retransmitting of the RRC CONNECTION REQUEST message.

Step 508: once the RRC connection establishment procedure of the UE fails, the UE turning into the Idle mode, and implementing a series of operations regulated by protocol after turning from the RRC Connected mode to the Idle mode, and then ending the current procedure.

Embodiment Two

In this embodiment, the RRC CONNECTION REQUEST message is transmitted only once, and for this reason, no procedures on the counter and the state variable will be considered, including setting, comparing and checking of the counter and the state variable.

Figure 6:
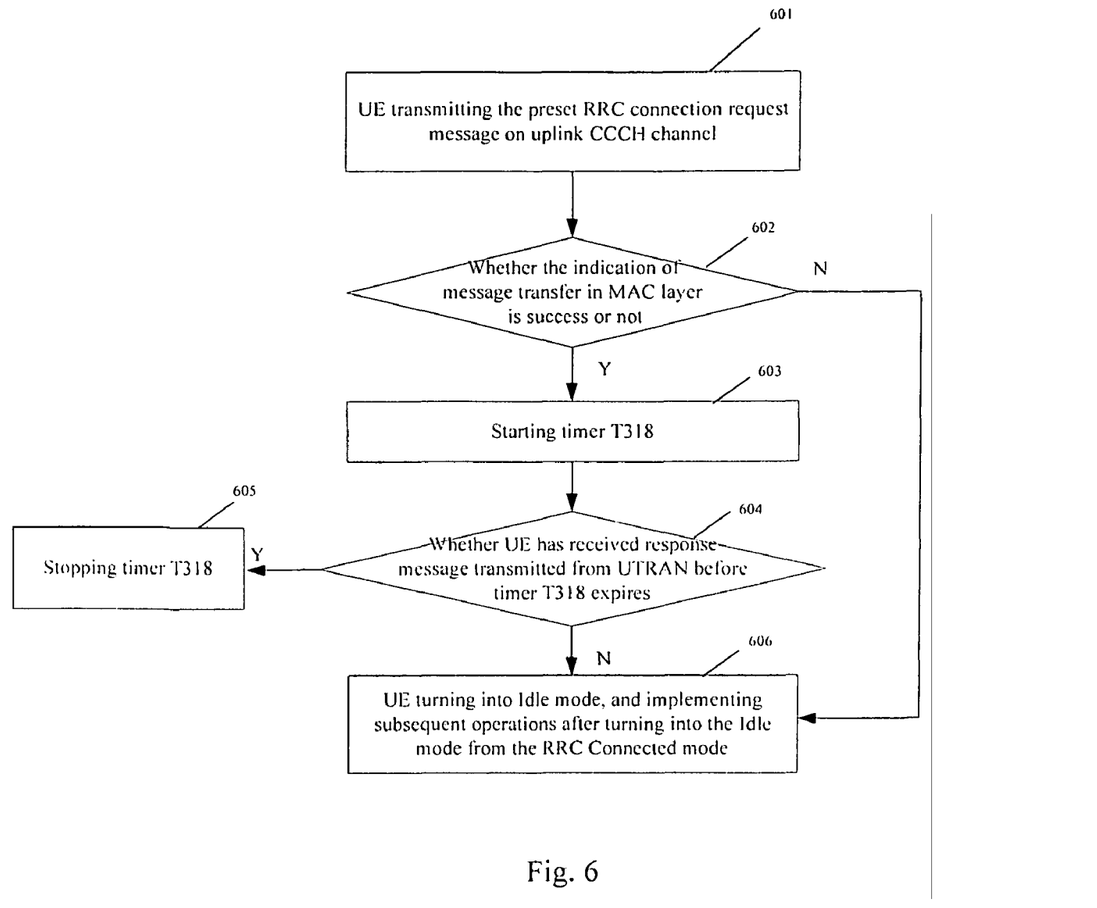
FIG. 6 is a schematic flowchart illustrating implementing procedures of another embodiment in accordance with the present invention.

As shown in FIG. 6, the processing procedure of transmitting the RRC CONNECTION REQUEST message in this embodiment includes the following steps:

Step 601: After setting the contents of the RRC CONNECTION REQUEST message, the UE transmitting the preset RRC CONNECTION REQUEST message on the uplink CCCH channel.

Step 602 to 603: if the MAC layer indicating the message has been transmitted successfully, starting the timer T318; otherwise, going to Step 606.

Step 604 to 605: if the UE has received the response message transmitted from UTRAN before the timer T318 expires, showing the RRC connection establishment procedure of the UE is successful, and ending the current procedure; otherwise, going to Step 606.

Step 606: Once the RRC connection establishment procedure of the UE fails, the UE turning into the Idle mode, and implementing a series of operations regulated by protocol after turning from the RRC Connected mode to the Idle mode, and then ending the current procedure.

Embodiment Three

In this embodiment, the RRC CONNECTION REQUEST message is transmitted several times. Now referring to FIG. 7, the processing procedures of transmitting the RRC CONNECTION REQUEST message in this embodiment includes the following steps:

Step 701: After setting the contents of the RRC CONNECTION REQUEST message, the UE transmitting the preset RRC CONNECTION REQUEST message on the uplink CCCH channel, and setting the value of the state variable V300 to 1; at same time, the UE setting the value of the counter N300. Wherein, the initial value of the counter N300 is set by the network, and the network transmitting the value to the UE through one standardized message, the UE then setting the initial value of the counter based on the parameters in the message, practical processing steps follow the prior procedures regulated by the standard, no details will be discussed hereinafter.

Figure 7:
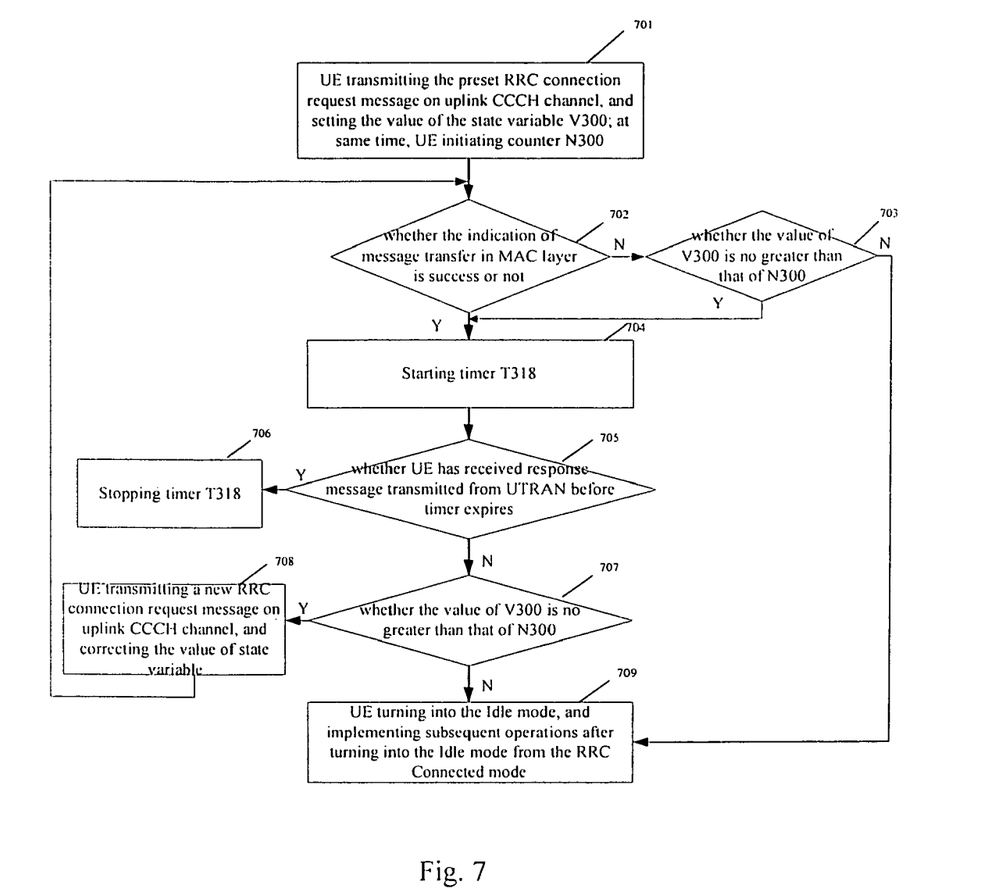
FIG. 7 is a schematic flowchart illustrating implementing procedures of another embodiment in accordance with the present invention.

Step 702 to 704: if the MAC layer indicating the message has been transmitted successfully, starting the timer T318; otherwise, checking whether the value of the state variable V300 is not greater than that of counter N300, if yes, then starting the timer T318; otherwise, going to Step 709.

Step 705 to 706: if the UE has received the response message transmitted from UTRAN before the timer T318 expires, showing the RRC connection establishment procedure of the UE is successful, and then ending the current procedure; otherwise, going to Step 707.

Step 707 to 708: checking whether the value of the state variable V300 is not greater than that of the counter, if yes, then UE transmitting a new RRC CONNECTION REQUEST message on the uplink CCCH channel, and correcting the value of the state variable V300, and returning to Step 702; otherwise, going to Step 709.

Wherein, the value of the counter N300 corresponds to the threshold value of the state variable V300, the state variable V300 corresponds to the practical counting value indicating times of message transmit. If setting the value of the state variable V300 to 1 and the value of the counter N300 to 0, then it will become a special case of this embodiment, in this case, it corresponds to transmitting the RRC CONNECTION REQUEST message only once.

In step 708, there are two means to correct the value of the state variable V300: one of which is that, if the value of the counter N300 is the maximum of the state variable V300 value, then correcting refers to increasing the value of the state variable V300 by degrees, for instance, adding 1 at one time; another is that, if the value of the counter N300 is the minimum of the state variable V300 value, then correcting refers to descending the value of the state variable V300 by degrees, for instance, reducing 1 at one time. In this embodiment, it refers to increasing the value of the state variable V300 by degrees.

Step 709: Once the RRC connection establishment procedure of the UE fails, the UE turning into the Idle mode, and implementing a series of operations regulated by protocol after turning from the RRC Connected mode to the Idle mode, and then ending the current procedure.

Although certain preferred embodiments of the present invention have been described herein, it should be understood various variations and/or modifications can be made without departing from the spirit and the scope of the present invention as set forth in the following claims.

What is claimed is:

1. A method for use in a connection establishment procedure, comprising:
transmitting a request message from a User Equipment (UE) to a network entity through a Medium Access Control (MAC) layer;
setting an initial value of a counter, and setting a threshold value of the counter; and
indicating, by the MAC layer, whether the request message has been transmitted successfully,
if the MAC layer indicates that the request message has not been transmitted successfully, ending the connection establishment procedure with failure and without starting a timer in the UE; or
if the MAC layer indicates that the request message has been transmitted successfully, starting the timer in the UE; and
if a response from the network entity is received before the timer expires, stopping the timer, or
if no response from the network entity is received before the timer expires,
retransmitting the request message to the network entity, changing the current value of the counter and returning to the process of the MAC layer indicating whether the request message has been transmitted successfully, if the current value of the counter is not greater than the threshold value of the counter; or
ending the connection establishment procedure with failure, if the current value of the counter is greater than the threshold value of the counter.

2. The method according to claim 1, wherein the initial value of the counter is set to 1; and the threshold value of the counter is set to 0.

3. The method according to claim 1, wherein the threshold value of the counter is set by the network entity and sent to the UE through a standardized message.

4. The method according to claim 1, wherein, if the threshold value of the counter is the maximum of the current counter, then changing the current value of the counter comprises increasing the current value of the counter by a number of degrees.

5. The method according to claim 1, wherein if the threshold value of the counter is the minimum of the current counter, then changing the current value of the counter comprises decreasing the current value of the counter by a number of degrees.

6. The method according to claim 1, further comprising: setting the initial value of the counter to 1 before the MAC layer indicates whether the message has been transmitted successfully; setting the threshold value of the counter to 0 before the MAC layer indicates whether the message has been transmitted successfully or while starting the timer; and checking and confirming that the current value of the counter is greater than the threshold value of the counter before ending the connection establishment procedure if no response from the network entity is received before the timer expires.

7. The method according to claim 1, wherein the method further comprises:
the UE turning into an idle mode and implementing all operations from a connection mode to the idle mode before ending the connection establishment procedure.

8. The method according to claim 1, wherein:
the request message is a Radio Resource Control (RRC) request message or a counting response message.

9. The method according to claim 8, wherein the RRC request message comprises a RRC connection request message or a cell update message.

10. The method according to claim 8, wherein the method further comprises:
the UE turning into the idle mode and implementing all operations from the connection mode to the idle mode before ending the connection establishment procedure.

11. A method for use in a Radio Resource Control (RRC) connection establishment procedure, comprising:
transmitting a request message from a User Equipment (UE) to a network entity through a Medium Access Control (MAC) layer;
setting an initial value of a counter, and setting a threshold value of the counter;
indicating, by the MAC layer, whether the request message has been transmitted successfully,
if the MAC layer indicates that the request message has not been transmitted successfully, ending the RRC connection establishment procedure and without starting a timer in the UE; or
if the MAC layer indicates that the request message has been transmitted successfully, starting the timer in the UE; and
if the UE has received a response from the network entity before the timer expires, stopping the timer, or
if the UE has not received a response from the network entity before the timer expires,
retransmitting the request message to the network entity, changing the current value of the counter and returning to the process of the MAC layer indicating whether the request message has been transmitted successfully, if the current value of the counter is not greater than the threshold value of the counter; or
ending the RRC connection establishment procedure, if the current value of the counter is greater than the threshold value of the counter.

12. The method according to claim 11, wherein the request message comprises a Radio Resource Control (RRC) message or a counting response message.

13. The method according to claim 11, wherein setting the threshold value of the counter comprises:
the network entity setting the threshold value of the counter, and sending the threshold value to the UE through a standardized message.

14. The method according to claim 11, wherein, if the threshold value of the counter is the maximum of the current counter, then changing the current value of the counter comprises increasing the current value of the counter;
or, if the threshold value of the counter is the minimum of the current counter, then changing the current value of the counter comprises decreasing the current value of the counter.

15. The method according to claim 11, further comprising:
setting the initial value of the counter to 1 before the MAC layer indicates whether the request message has been transmitted successfully;
setting the threshold value of the counter to 0 before the MAC layer indicates whether the request message has been transmitted successfully or while starting the timer; and
checking and confirming that the current value of the counter is greater than the threshold value of the counter before ending the RRC connection establishment procedure if the UE has not received the response from the network entity before the timer expires.

16. The method according to claim 11, wherein the method further comprises:

the UE turning into an idle mode and implementing all operations from a connection mode to the idle mode before ending the RRC connection establishment procedure.

17. A User Equipment (UE), comprising: a transmitter, configured to transmit a request message to a network entity through a Medium Access Control (MAC) layer in a connection establishment procedure; a receiver, configured to receive an indication from the MAC layer whether the request message has been transmitted successfully, and a response from the network entity; a timer, a counter, and a processor, configured to set an initial value of the counter, and set a threshold value of the counter; and if the MAC layer indicates that the request message has not been transmitted successfully, the processor is further configured to end the connection establishment procedure with failure and without starting the timer; or if the MAC layer indicates that the request message has been transmitted successfully, the processor is further configured to start the timer; and if the response from the network entity is received before the timer expires, the processor is further configured stop the timer, or if no response from the network entity is received before the timer expires, the processor is further configured to: retransmit the request message to the network entity, change the current value of the counter and return to the process of the receiver receiving indication from the MAC layer indicating whether the request message has been transmitted successfully, if the current value of the counter is not greater than the threshold value of the counter; or end the connection establishment procedure with failure, if the current value of the counter is greater than the threshold value of the counter.

18. A User Equipment (UE) for use in a Radio Resource Control (RRC) connection establishment procedure, comprising: a transmitter, configured to transmit a request message to a network entity through a Medium Access Control (MAC) layer in the RRC connection establishment procedure; a receiver, configured to receive an indication from the MAC layer whether the request message has been transmitted successfully, and a response from the network entity; a timer, a counter, and a processor, configured to set an initial value of the counter, and set a threshold value of the counter; and if the MAC layer indicates that the request message has not been transmitted successfully, the processor is further configured to end the RRC connection establishment procedure with failure and without starting the timer; or if the MAC layer indicates that the request message has been transmitted successfully, the processor is further configured to start the timer; and if the response from the network entity is received before the timer expires, the processor is further configured stop the timer, or if no response from the network entity is received before the timer expires, the processor is further configured to: retransmit the request message to the network entity, change the current value of the counter and return to the process of the receiver receiving indication from the MAC layer indicating whether the request message has been transmitted successfully, if the current value of the counter is not greater than the threshold value of the counter; or end the RRC connection establishment procedure with failure, if the current value of the counter is greater than the threshold value of the counter.

* * * * *